United States Patent
Moliner et al.

(10) Patent No.: US 8,364,130 B2
(45) Date of Patent: Jan. 29, 2013

(54) ESTABLISHING SESSIONS BETWEEN DEVICES IN A NETWORK

(75) Inventors: Olivier Moliner, Malmö (SE); Henrik Bengtsson, Lund (SE)

(73) Assignee: Sony Mobile Communications AB, Lund (SE)

( * ) Notice: Subject to any disclaimer, the term of this patent is extended or adjusted under 35 U.S.C. 154(b) by 85 days.

(21) Appl. No.: 12/831,585

(22) Filed: Jul. 7, 2010

(65) Prior Publication Data

US 2011/0281567 A1 Nov. 17, 2011

Related U.S. Application Data

(60) Provisional application No. 61/333,918, filed on May 12, 2010.

(51) Int. Cl.
 *H04W 4/14* (2009.01)
(52) U.S. Cl. ..................................... 455/414.3; 455/466
(58) Field of Classification Search ........... 455/414.1–3, 455/466, 428, 455; 370/328, 338, 467, 395.1, 370/396, 395.52–53
See application file for complete search history.

(56) References Cited

U.S. PATENT DOCUMENTS

| | | | |
|---|---|---|---|
| 6,693,886 B1 * | 2/2004 | Haikonen et al. | 370/338 |
| 2001/0015977 A1 * | 8/2001 | Johansson | 370/392 |
| 2005/0135391 A1 * | 6/2005 | Sung | 370/401 |
| 2005/0288045 A1 | 12/2005 | Yang et al. | |
| 2006/0240824 A1 | 10/2006 | Henderson et al. | |
| 2007/0142029 A1 | 6/2007 | Willehadson et al. | |
| 2007/0265023 A1 | 11/2007 | Bengtsson et al. | |
| 2008/0101278 A1 * | 5/2008 | Bengtsson et al. | 370/328 |
| 2010/0189238 A1 * | 7/2010 | Gupta | 379/202.01 |

* cited by examiner

*Primary Examiner* — Cong Tran

(74) *Attorney, Agent, or Firm* — Snyder, Clark, Lesch & Chung, LLP

(57) ABSTRACT

A method may include generating a discovery ID, wherein the discovery ID identifies an IP connection between a network device and a user device. The method may further include receiving a short message service (SMS) message from the user device, wherein the SMS message includes the discovery ID. The method may further include determining a telephone number associated with the user device based on a sender ID of the SMS message. Further, the method may also include transmitting a value indicative of the telephone number to the user device through the IP connection based on the discovery ID received in the SMS message.

20 Claims, 14 Drawing Sheets

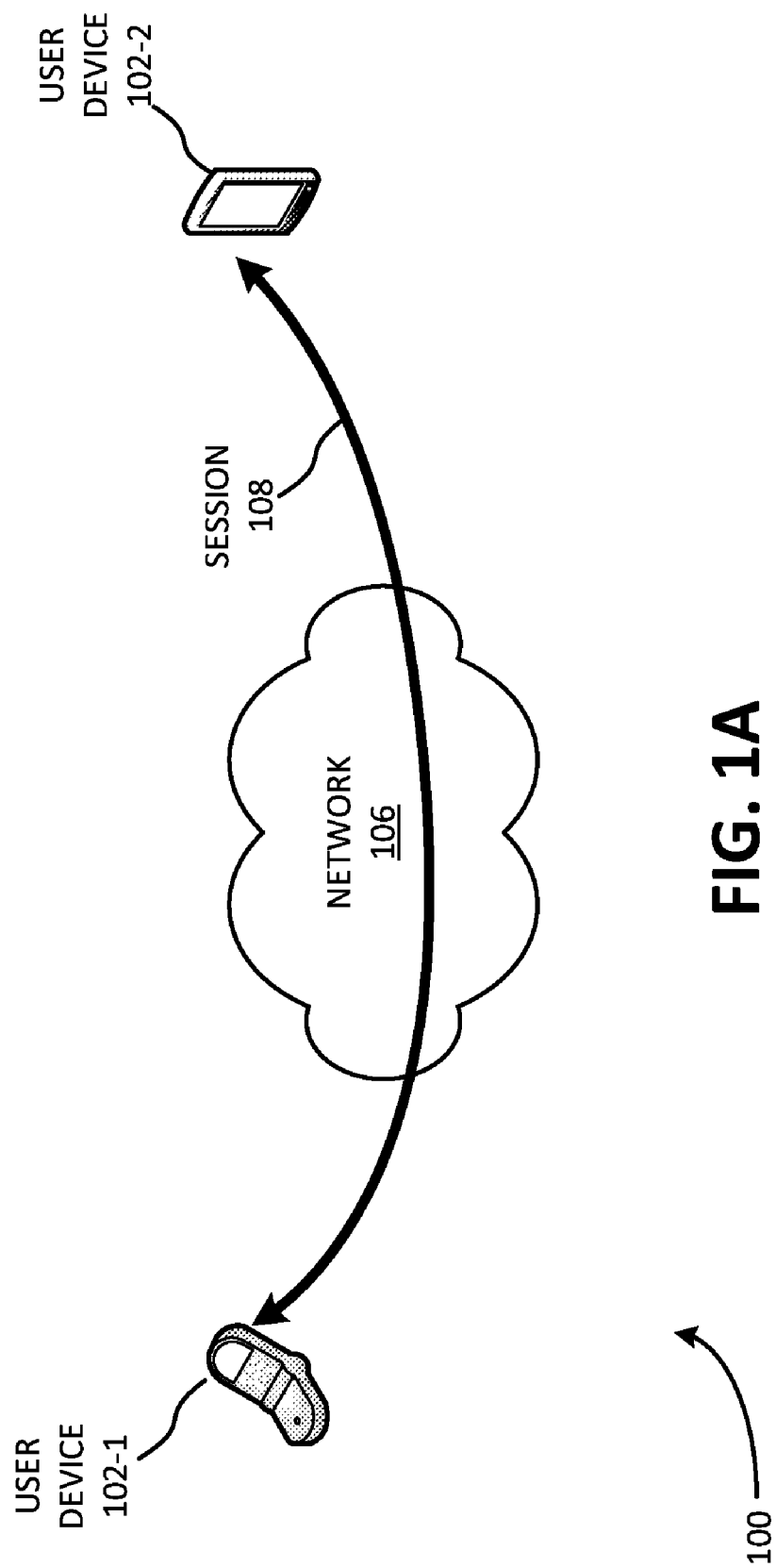

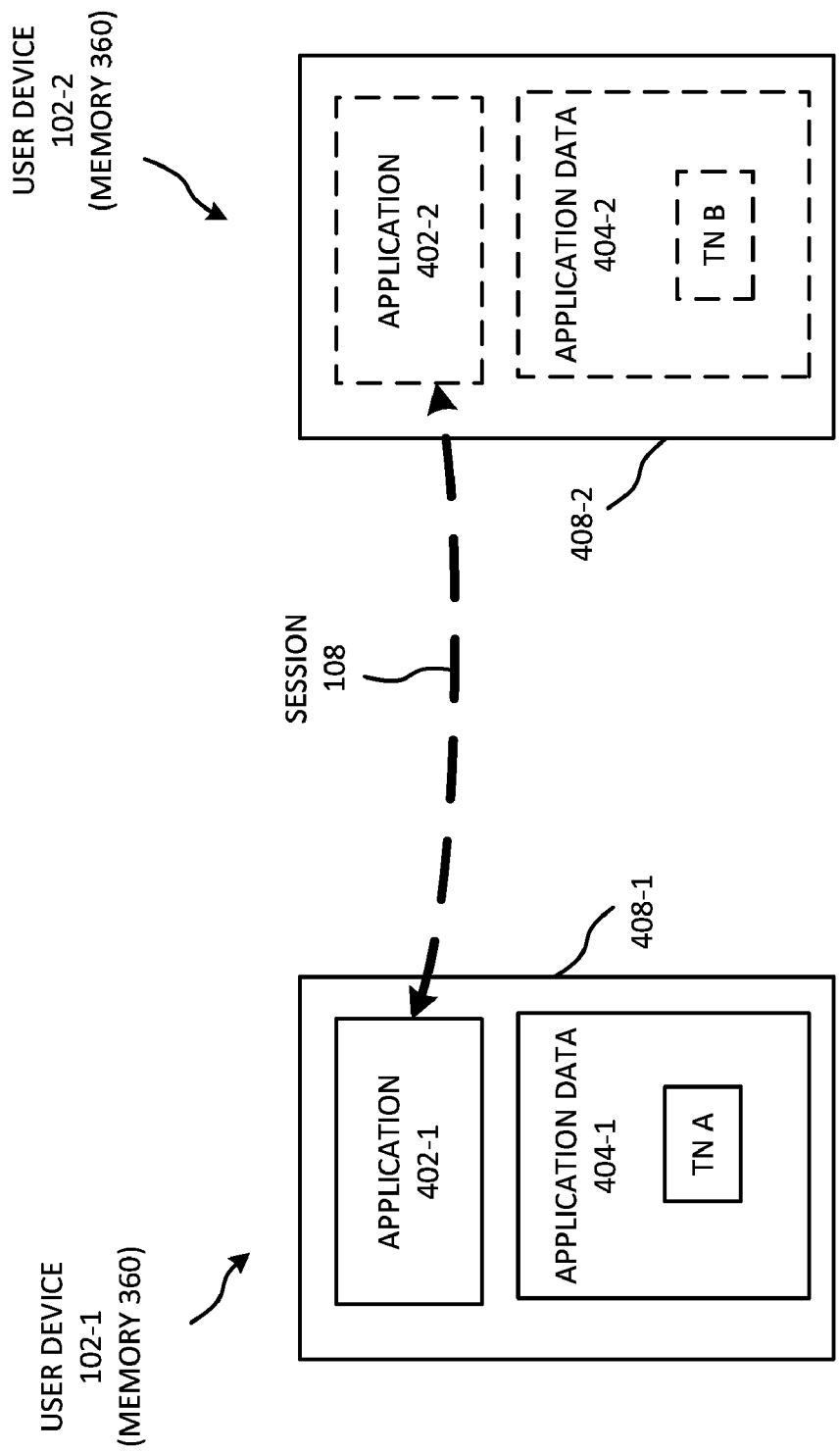

SESSION TABLE 424

| SESSION ID 502 | PARTIES 504 | STATE 506 | SESSION PARAMETERS 510 |
|---|---|---|---|
| 65387 | [TN A], [TN B] | OPEN | [ADDR. DEVICE 102-1], [ADDR DEVICE 102-2], [CONNECTION SPEED], [PROTOCOL] |
| ... | ... | ... | ... |

DISCOVERY TABLE 428

| DISCOVERY ID 542 | CONNECTION 544 | TELEPHONE NO. 546 |
|---|---|---|
| 58934 | [ADDR. DEVICE 102-2] | [TN B] |
| ... | ... | ... |

ANTI-SPOOFING TABLE 426

| TELEPHONE NO. 562 | NONCE 564 |
|---|---|
| [TN B] | 63891 |
| ... | ... |

ESTABLISHING SESSIONS BETWEEN DEVICES IN A NETWORK

RELATED APPLICATIONS

This application claims the benefit of U.S. Patent Application No. 61/333,918 filed May 12, 2010, entitled "Establishing Sessions Between Devices in a Network."

TECHNICAL FIELD OF THE INVENTION

One or more embodiments disclosed relate to establishing sessions between devices in a network.

DESCRIPTION OF RELATED ART

Users like to download and install applications in their mobile phones. They also like to share these applications with their friends, e.g., by encouraging their friends to download and install the same applications. In some cases, these applications may allow the user to interact with other users running applications on their mobile phones. For example, a user may download, install, and play a game on his mobile phone. He may share this game with his friends, and, if his friends install the application on their mobile phones, he may even play the game interactively with his friends.

SUMMARY

According to one aspect, a method may include generating a discovery ID, wherein the discovery ID identifies an IP connection between a network device and a user device; receiving a short message service (SMS) message from the user device, wherein the SMS message includes the discovery ID; determining a telephone number associated with the user device based on a sender ID of the SMS message; and transmitting a value indicative of the telephone number to the user device through the IP connection based on the discovery ID received in the SMS message.

According to another aspect, the method may include generating a nonce and transmitting an SMS message including the nonce to the user device using the determined telephone number; and wherein transmitting the value indicative of the telephone number to the user device includes transmitting the value indicative of the telephone number to the user device in response to receiving the nonce from the user device through the IP connection.

According to another aspect, the method may include receiving a session request from another user device, the session request for connecting to the user device associated with the telephone number; and connecting the user device and the other user device in a session or transmitting information to the other user device and the user device for connecting in a session.

According to another aspect, the method may include receiving a request from the user device for an identification of the session, wherein the request for the identification of the session includes the value indicative of the telephone number.

According to another aspect, the method may include transmitting the value indicative of the session to the other device for the other user device to send to the user device.

According to another aspect, generating the discovery ID may include generating the discovery ID at the network device. The method may also include transmitting the discovery ID to the user device through the IP connection.

According to another aspect, a system may include a network device. The network device may include a memory to store a table of discovery IDs, wherein each discovery ID identifies one of a plurality of IP connections between the network device and a corresponding user device of a plurality of user devices; a short message service (SMS) gateway comprising a receiver to receive an SMS message from one of the plurality of user devices, the SMS message including one of the plurality of discovery IDs; wherein the network device further comprises a processor to determining the telephone number associated with the one of the plurality of user devices based on a sender ID of the SMS message and to determine the corresponding IP connection based on the discovery ID received in the SMS message and the table of discovery IDs; and a transmitter to send a value indicative of the telephone number to the one of the plurality of user devices through the corresponding IP connection.

According to another aspect, the processor may generate a nonce; wherein the SMS gateway includes a transmitter to transmit an SMS message including the nonce to the one of the plurality of user devices using the determined telephone number; and wherein the transmitter of the network device is configured to send the value indicative of the telephone number transmits the value to the user device in response to receiving the nonce from the user device through the IP connection.

According to another aspect, the receiver may be configured to receive a session request from another user device, the session request for connecting to the user device associated with the telephone number; and wherein the network device may connect the user device and the other user device in a session or wherein the transmitter is configured to transmit information to the other user device and the user device for connecting in a session.

According to another aspect, the receiver is configured to receive a request from the user device for an identification of the session, wherein the request for the identification of the session includes the value indicative of the telephone number.

According to another aspect, the transmitter is configured to transmit the value indicative of the session to the other device for the other user device to send to the user device.

According to another aspect, the transmitter transmits the discovery ID to the user device through the IP connection. The transmitter of the SMS gateway may be configured to send the SMS includes a network device includes a transmitter to send an SMS message from the user device including the discovery ID.

According to another aspect, the system may include the user device and the other user device, wherein the user device includes a transmitter to send the SMS message from the user device including the discovery ID.

According to another aspect, a method may include transmitting a short message service (SMS) message from a user device, wherein the SMS message includes a discovery ID that identifies an IP connection between a network device and the user device, wherein the SMS message is used to determine the telephone number associated with the user device based on a sender ID of the SMS message; and receiving a value indicative of the telephone number to the user device through the IP connection based on the discovery ID received in the SMS message.

According to another aspect, the method may include receiving a nonce in an SMS message and transmitting an SMS message including the nonce to the user device using the determined telephone number; wherein receiving the value indicative of the telephone number to the user device includes receiving the value indicative of the telephone number to the user device in after receiving transmitting the SMS message including the nonce.

According to another aspect, the method may include transmitting a request from the user device for an identification of the session, wherein the request for the identification of the session includes the value indicative of the telephone number.

According to another aspect, the method may include receiving the value indicative of the session.

According to another aspect, the method may include receiving the discovery ID from the network device.

According to another aspect, the method may include transmitting a session request from another user device, the session request for connecting to the user device associated with the telephone number; and transmitting the user device and the other user device in a session or transmitting information to the other user device and the user device for connecting in a session.

BRIEF DESCRIPTION OF THE DRAWINGS

Reference is made to the attached drawings, wherein elements having the same reference number designation may represent like elements throughout.

FIGS. 1A and 1B are diagrams of an exemplary environment in which embodiments disclosed herein may be implemented;

FIGS. 4A and 4B are block diagrams of exemplary components of the user devices and the session server in the environment of FIG. 1;

FIGS. 5A through 5C are block diagrams of exemplary data tables stored in the session server in the environment of FIG. 1;

DETAILED DESCRIPTION

Figure 1B:
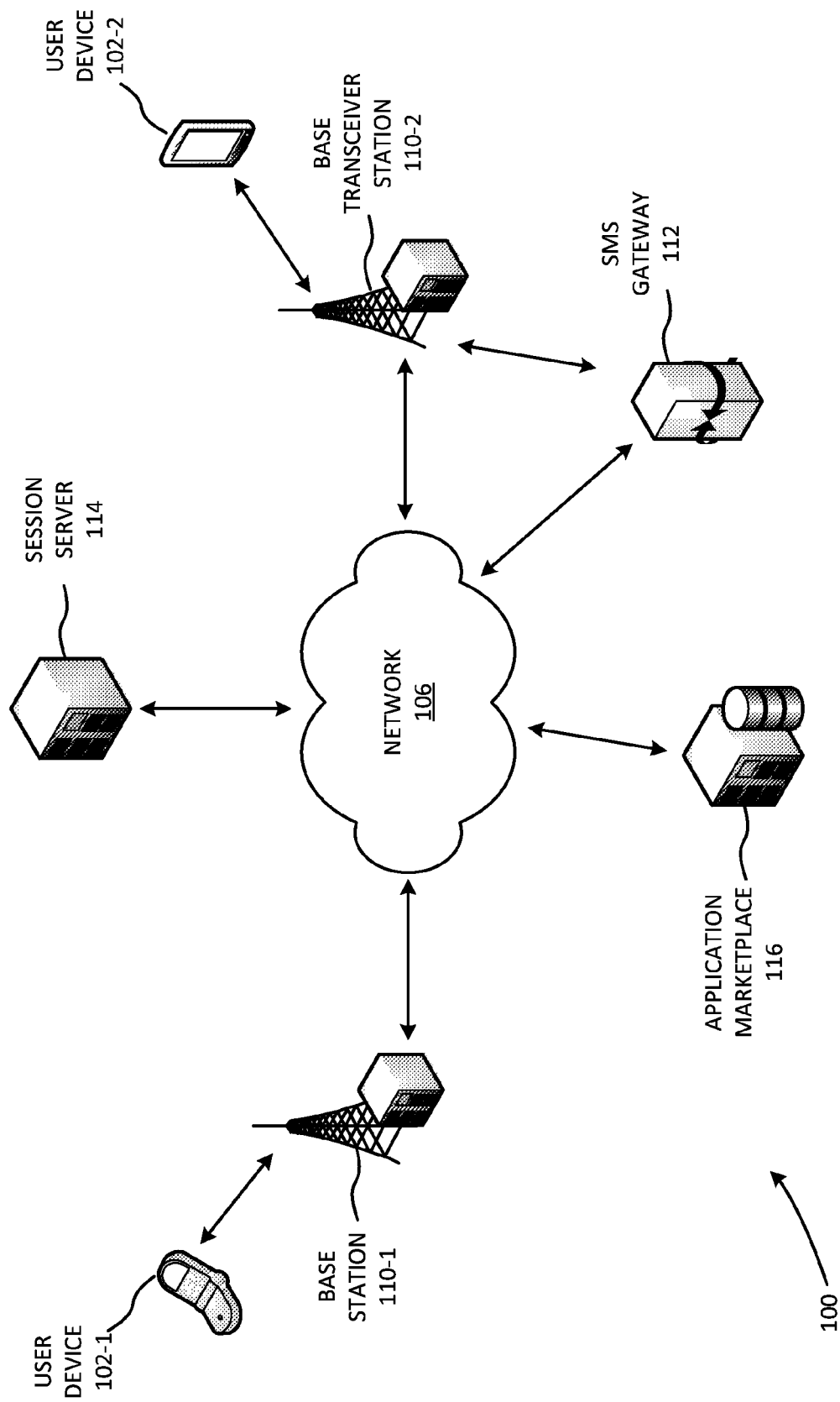

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Exemplary System

If a software developer makes an application for a device, the developer often hopes that users will like the application enough to recommend the application to the users' friends. Thus, the developer may try to make it as easy as possible for a user to share the application, such as by allowing the user to send an email or text message to a friend permitting the friend to follow a link to install the application on the friend's device. This process may be termed the "viral spread" of a user application. If the application allows for interaction between users running the application on different devices, the developer may also try to make it as easy as possible for users to connect their respective applications in an interactive session (e.g., without undue annoyances for any user). For example, one user may want his friend to download a game for interactive playing without his friend having to register the game, pick a username, select a password, etc. One or more embodiment disclosed herein may allow for the "viral spread" of an application while also allowing instances of the application to easily connect to other instances of the application for interactivity between users.

FIG. 1A is a diagram of an exemplary environment 100 in which embodiments disclosed herein may be implemented. Environment 100 may include user devices 102-1 and 102-2 (collectively "user devices 102," individually "user device 102-$x$") and a network 106. User devices 102 may run applications installed by their respective users. One embodiment described herein allows for the establishment of a session 108 between an application running in user device 102-1 and an application running user device 102-2. Session 108 may include, for example, an Internet Protocol (IP) data session through network 106. Another embodiment allows for the user of device 102-1 to share an application with the user of device 102-2 while also establishing session 108 between the application running in device 102-1 and the application downloaded to device 102-2. Yet another embodiment allows an application to discover the telephone number associated with its host device (e.g., user device 102-1). Further, one embodiment allows an application in user device 102-1 to register with a server so as to enjoy services provided by that server.

User device 102-$x$ may, in one embodiment, include a mobile phone that allows a user to initiate a telephone call to another device or to receive a telephone call from another device. In one embodiment, user device 102-$x$ may be able to receive and/or send short message service (SMS) messages (e.g., "text messages") to another user device. User device 102-$x$ may, in one embodiment, download, install, and execute applications from, for example, application marketplace 116. User device 102-$x$ may also include a tablet computer, a netbook, a laptop computer, a desktop computer, personal digital assistant (PDA), or another communication device.

Network 106 may include one or more wired and/or wireless networks that may receive and transmit data, sound (e.g., voice), and/or video signals. Network 106 may include one or more circuit-switched networks (e.g., a mobile telephone network, a core network, and/or a public-switched telephone network (PSTN)) for handling voice calls and/or text messages between user devices 102. Network 106 may also include one or more packet-switched networks, such as an IP network, a local area network (LAN), a wide area network (WAN), a personal area network (PAN), an intranet, the Internet, or another type of network that is capable of transmitting data. Network 106 may allow devices in environment 100 to connect to other devices in environment 100.

FIG. 1B is a more detailed diagram of exemplary environment 100. In addition to user devices 102 and network 106, environment 100 may include base transceiver stations (BTSs) 110-1 and 110-2 (collectively "BTSs 110", individually "BTS 110-$x$"), SMS gateway 112, session server 114, and application marketplace 116.

BTS 110-$x$ may include an antenna, a transmitter, and a receiver (e.g., a transceiver) to transmit and receive wireless signals to/from other devices, such as user devices 102. User device 102-$x$ may communicate with other devices via BTS 110-$x$ using wireless communication standards and/or protocols, such as GSM (Global System for Mobile Communications), CDMA (Code-Division Multiple Access), WCDMA (Wideband CDMA), GPRS (General Packet Radio Service), EDGE (Enhanced Data Rates for GSM Evolution), Universal Mobile Telecommunications System (UMTS), High-Speed Downlink Packet Access (HSDPA), etc. In one embodiment, user device 102-x may communicate with other devices using wireless network standards, such as WiFi (e.g., IEEE 802.11x) or WiMAX (e.g., IEEE 802.16x). In yet another embodiment, user device 102-x may communicate with other devices via a wired network using, for example, a public-switched telephone network (PSTN) or an Ethernet network.

SMS gateway 112 may provide a gateway between a mobile telephone network and another network, such as the Internet. SMS gateway 112 may receive SMS messages from user device 102-x through base station 110 and may forward the SMS message through network 106 (e.g., through the Internet) to another device in environment 100.

Application marketplace 116 may store a repository of applications for downloading, installing, and executing in user devices 102. For example, application marketplace 116 may include the Apple App Store, the Android Marketplace, etc.

Session server 114 may provide services for an application running in one user device (e.g., user device 102-1) to connect (e.g., through session 108) to another user device (e.g., user device 102-2). Session server may also provide servers to allow the user of device 102-1 to share an application with the user of device 102-2 while also establishing a session 108 between the application running in device 102-1 and the application downloaded to device 102-2. Session server 114 may also allow for an application to discover the telephone number associated with its host device (e.g., user device 102-1). Further, session server 114 may provide services to allow an application executing in user device 102-x to register so as to enjoy services provided by that server.

The exemplary configuration of devices in environment 100 is illustrated for simplicity. Environment 100 may include more devices, fewer devices, or a different configuration of devices than illustrated in FIG. 1B. As one example, environment 100 may include a wireless router (e.g., employing WiFi) that may connect to user devices 102 to network 106. As another example, environment 100 may include thousands or millions of user devices 102. Further, the connections shown in FIG. 1B are exemplary. In other embodiments, additional connections that are not shown in FIG. 1B may exist between devices (e.g., each device may be connected to every other device). The connections in FIG. 1B may also be wireless or wired. In some embodiments, the functions performed by two or more devices may be performed by any one device. Likewise, in some embodiments, the functions performed by any one device may be performed multiple devices.

Figure 2:
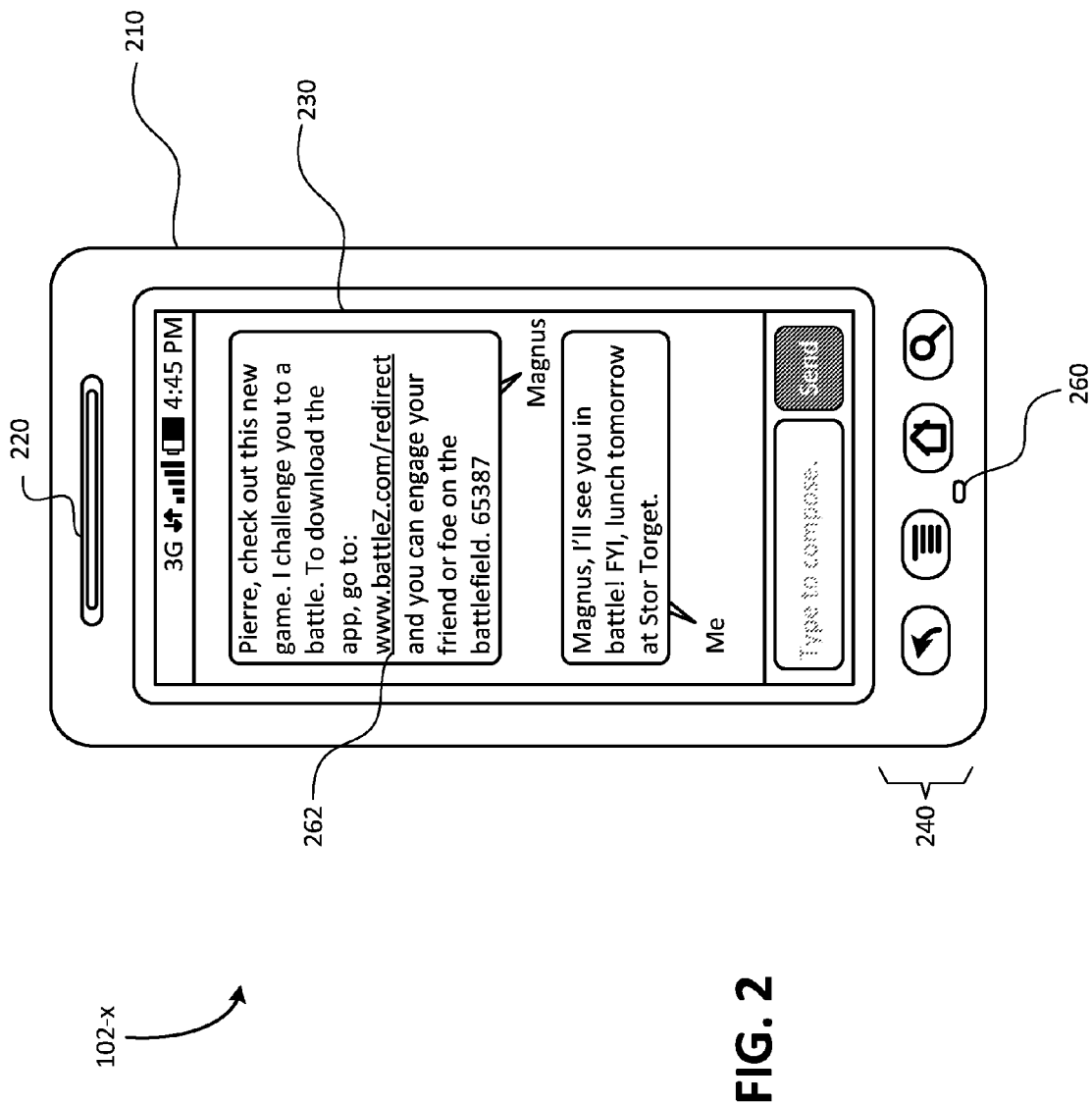
FIG. 2 is a diagram of an exemplary user device in the environment of FIG. 1.

FIG. 2 is a diagram of an exemplary user device 102-x. User device 102-x may include a housing 210, a speaker 220, a display 230, control buttons 240, and a microphone 260. User device 102-x may include more, fewer, or different components than shown in FIG. 2.

Housing 210 may protect the components of user device 102-x from outside elements. Speaker 220 may provide audible information to a user of user device 102-x. Microphone 160 may receive audible information from the user. Control buttons 140 may permit the user to interact with user device 102-x to cause user device 102-x to perform one or more operations. In the exemplary implementation of FIG. 2, control buttons 140 may include a back button, a menu button, a home button, and a search button. In one embodiment, user device 102-x may also include a keypad (e.g., a standard telephone keypad).

Display 230 may provide visual information to the user. For example, display 230 may provide information regarding incoming or outgoing telephone calls, e-mail, instant messages, SMS messages, etc. Display 230 may also display information regarding various applications, such as a game, a phone book/contact list, downloaded content (e.g., downloaded applications), etc. Display 230 may include a touch screen display that allows a user to enter commands and/or information via a finger, a stylus, a mouse, a pointing device, etc. For example, display 230 may be a resistive touch screen, a capacitive touch screen, an optical touch screen, an infrared touch screen, a surface acoustic wave touch screen, or any other type of touch screen device that registers an input based on a contact with display 230.

Figure 3:
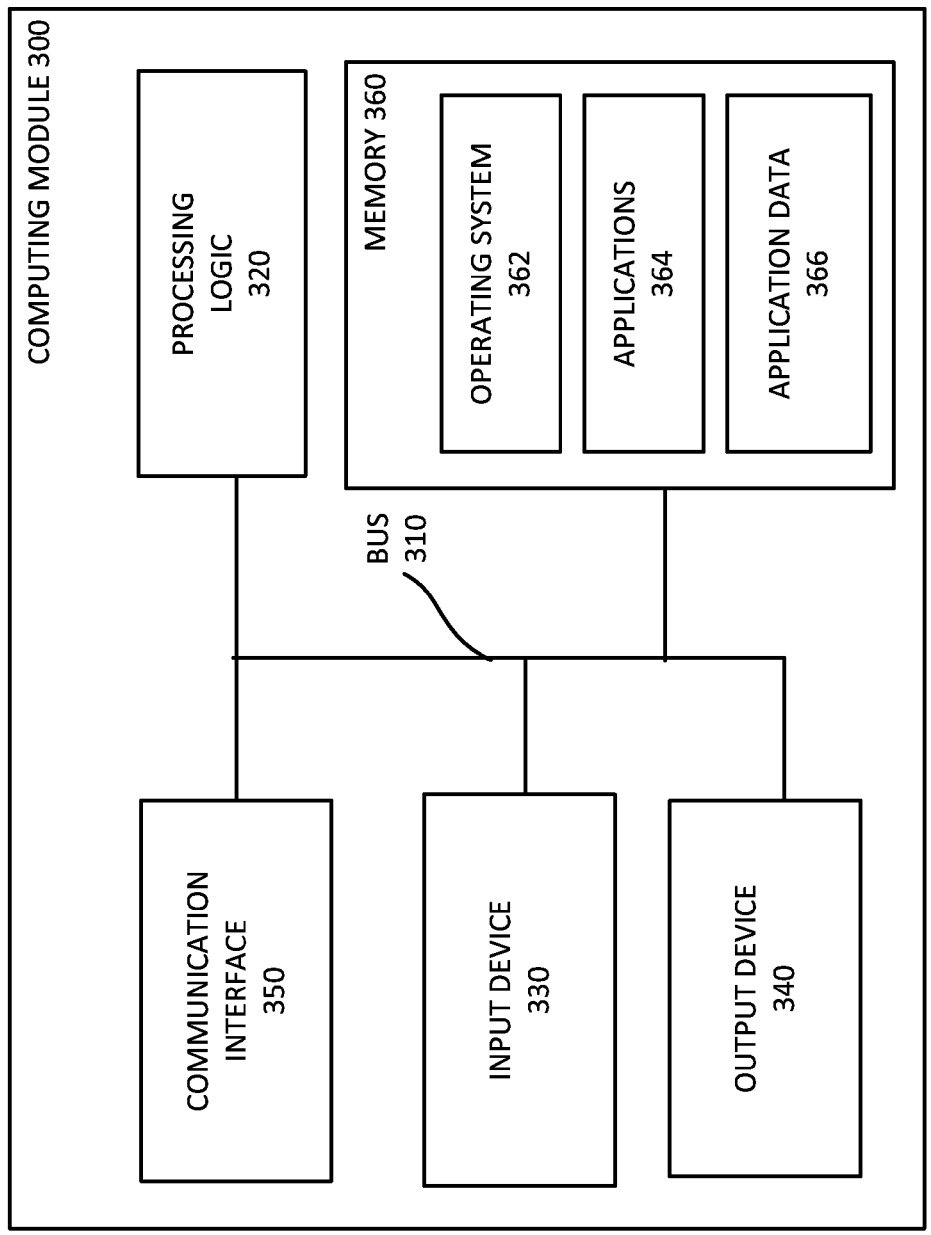
FIG. 3 is a block diagram of exemplary components of a computing module in one or more of the devices in the environment of FIG. 1.

Each user device 102-x may include one or more computing modules 300. FIG. 3 is a block diagram of exemplary components of a computing module 300. Computing module 300 may include a bus 310, processing logic 320, an input device 330, an output device 340, a communication interface 350, and a memory 360. Computing module 300 may include additional, fewer, or different components than the ones illustrated in FIG. 3 that aid in receiving, transmitting, and/or processing data. Moreover, other configurations of components in computing module 300 are possible.

Bus 310 may include a path that permits communication among the components of computing module 300. Processing logic 320 may include any type of processor or microprocessor (or groups of processors or microprocessors) that interprets and executes instructions. In other embodiments, processing logic 320 may include one or more application-specific integrated circuits (ASICs) or field-programmable gate arrays (FPGAs).

Input device 330 may permit a user to input information into computing module 300 and output device 340 may output information to the user. Input device 330 and output device 340 may allow the user to receive and view a menu of options and select from the menu options. The menu may allow the user to select the functions or services associated with applications or software executed by computing module 300. In the case of user devices 102, input device 330 may include display 230 (e.g., a touch screen), control buttons 240, and microphone 260; and output device 340 may include display 230, speaker 220, etc.

Communication interface 350 may include a transceiver that enables computing module 300 to communicate with other devices or systems. Communications interface 350 may include a network interface card, e.g., Ethernet card, for wired communications or a wireless network interface (e.g., a WiFi) card for wireless communications. Communication interface 350 may implement a wireless communication protocol, e.g., GSM, CDMA, WCDMA, GPRS, EDGE, LTE, etc. Communication interface 350 may also include, for example, a universal serial bus (USB) port for communications over a cable, a Bluetooth™ wireless interface for communicating with Bluetooth devices, a near-field communication (NFC) interface, etc.

Memory 360 may include a computer-readable medium, which may include a physical or logical memory device. Memory 360 may include a random access memory (RAM) or another type of dynamic storage device that may store information and instructions, e.g., an application, for execution by processing logic 320; a read-only memory (ROM) device or another type of static storage device that may store static information and instructions for use by processing logic 320; or some other type of magnetic or optical recording medium and its corresponding drive, e.g., a hard disk drive (HDD), a solid state drive (SSD) or memory, for storing information and/or instructions.

Memory 360 may also include an operating system 362, applications 364, and application data 366. Operating system 362 may include software instructions for managing hardware and software resources of computing module 300. For example, in the case of user device 102-2, operating system 362 may include Android, WebOS, Symbian, Windows Mobile, iPhone OS, etc. Applications 364 may provide services to the user, for example. Applications may be written, for example, in Java, Lua, C, C++, C#, etc. Applications 364 may include a web browser, a contacts directory, a game, etc.

FIG. 4A provide more detailed examples of memory 360 of user devices 102. As shown in FIG. 4A, user device 102-1 may store an application 402-1 (e.g., one of applications 364) and application data 404-1 (e.g., part of application data 366) in memory 360. Application 402-1 and application data may be inside a sandbox 408-1.

Sandbox 408-1 may prevent application 402-1 from accessing data and/or functions outside sandbox 408-1 except when granted specific permission. Permission requests may be handled by the operating system (e.g., OS 362 of user device 102-1) in various ways, such as by prompting the user or based on security certificates. In other words, sandbox 408-1 prevents application 402-1 from improperly disrupting other applications or the operating system.

Application data 404-1 may include a telephone number of user device 102-1 (e.g., TN A). In one embodiment described below, application 402-1 may not be capable of accessing information stored in user device 102-1 to determine the telephone number (TN A). Rather, in an embodiment described below, application 402-1 may determine the telephone number (TN A) with the help of session server 114 and SMS gateway 112.

As also shown in FIG. 4A, user device 102-2 may store an application 402-2 (e.g., one of applications 364) and application data 404-2 (e.g., part of application data 366) in memory 360. Application 402-2 and application data 404-2 may be inside a sandbox 408-2 that behaves similarly to sandbox 408-1 described above. In the examples below, the user of user device 102-2 may download and install application 402-2, determine telephone number (TN B), and connect through session 108 to application 402-1 in user device 102-1.

Returning to FIG. 3, session server 114, application marketplace 116, and/or SMS gateway 112 may also include one or more computing modules 300. In the case these devices 112, 114, and/or 116, input device 330 may include a keyboard and a mouse and output device 340 may include an LCD display, for example. Alternatively, these devices 112, 114, and/or 116 may be "headless" devices without input device 330 or output device 340. Further, in the case of these devices 112, 114, and/or 116, OS 362 may include Windows Server, Linux, Unix, Solaris, for example. Further, applications 364 may provide services to other devices (e.g., a web server, etc.).

Figure 4B:
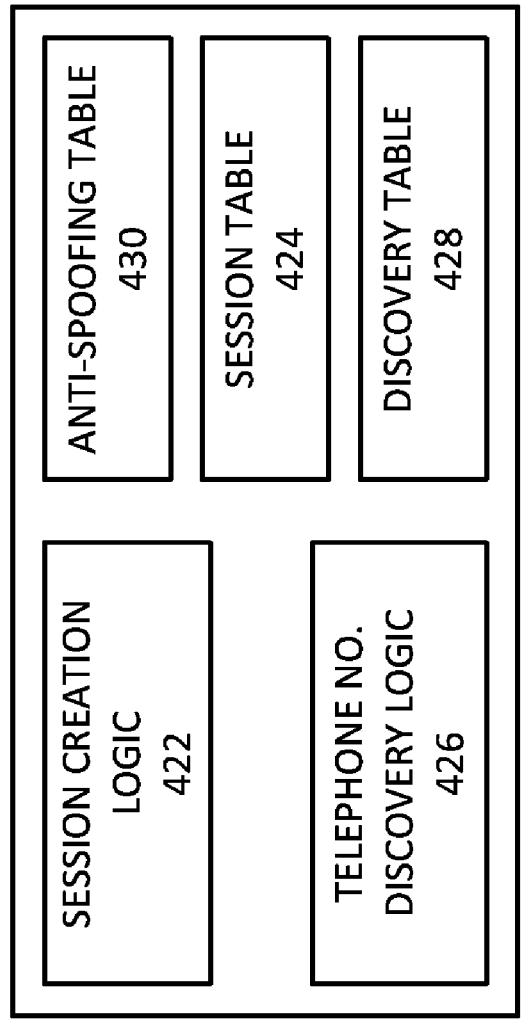

FIG. 4B is a block diagram of exemplary components of memory 360 of session server 114. Session server 114 may include session creation logic 422, telephone number discovery logic 426 ("discovery logic 426"), session table 424, discovery table 428, and anti-spoofing table 430.

Session creation logic 422 may create and track sessions between user devices 102. Discovery logic 426 may allow user device 102 to register with session server 114 for connecting to sessions and/or may allow user device 102 to discover the telephone number associated with user device 102.

Session table 424 may store information about open and ongoing sessions between devices 102 in environment 100. FIG. 5A is a block diagram of exemplary session table 424. Session table 424 may include a session ID field 502, a parties field 504, a state field 506, and a session parameters field 510. Session table 424 may include more, fewer, or different fields than shown in FIG. 5A.

Session ID field 502 may uniquely identify a session among or between participating parties. For example, one session may include Magnus playing BattleZ (using user device 102-1 to run application 402-1) against Pierre (using user device 102-2 to run application 402-2). If Magus and Pierre invite a third friend to join BattleZ game, the third friend may join the same session identified in session ID field 502. As shown in record 516, a session between Magnus and Pierre (e.g., between user devices 102) may be associated with a session ID of 65387.

Participating parties field 504 ("parties field 504") may identify the parties that may connect to the corresponding session. Parties may be identified by, for example, one or more of the following: telephone number, username, an application registration number, and/or a connection identifier (e.g., an IP address and/or port number). In one embodiment, one or more parties may be identified as an "inviting" party if that party has invited another party. Likewise, one or more parties may be identified as an "invited" party if that party has been invited by another party.

State field 506 may indicate the state of the corresponding session. For example, a state of "open" may indicate that a party is waiting for another party to join the session. A state of "ongoing" may indicate that at least two parties are currently engaged in a session. In one embodiment, each party may be associated with a state field.

Session parameters field 510 may identify the parameters of a session between the corresponding parties. For example, if the session is for a voice-over-IP or video call, the session parameters may include source and destination IP addresses and port numbers, media coding format, bit rate, frame rate, etc.

Returning to FIG. 4B, discovery table 428 may include information used during a registration process of an application running in user device 102 with a server. Discovery table 428 may also include information for an application running in user device 102-x to discover the telephone number associated with that device 102-x. FIG. 5B is a block diagram of an exemplary discovery table 428. Discovery table 428 may include a discovery ID field 542, a connection field 544, and a telephone number (TN) field 546. Discovery table 428 may include more, fewer, or different fields than shown in FIG. 5B.

Discovery ID field 542 may include an identifier to identify (e.g., uniquely) a registration request by a user device or a request by a user device for its telephone number. The identifier in discovery ID field 542 may be referred to as a "discovery ID."

Connection field 544 may identify a connection associated with a discovery ID. In one embodiment, when session server 114 receives a communication associated with particular discovery ID, it can cross reference discovery table 428 to determine the associated connection.

TN field 546 may include information to identify a telephone number associated with the corresponding connection and/or the corresponding discovery ID. In one embodiment, as discussed below, session server 114 may receive a message including a telephone and a discovery ID. Session server 114 may then associate the telephone number with the connection by storing the telephone number in the record having the same discovery ID as included in the message.

Returning to FIG. 4B, anti-spoofing table 430 may include information to prevent a device 102 from spoofing a telephone number during a registration or discovery process. FIG. 5C is a block diagram of an exemplary anti-spoofing table 430. Anti-spoofing table 430 may include a TN field 562 and a nonce field 564. Anti-spoofing table 430 may include more, fewer, or different fields than shown in FIG. 5C.

TN field 562 may include an indication of the telephone number. Nonce field 564 may include a nonce associated with the corresponding telephone number. The nonce may be transmitted to the corresponding telephone number. When messages are received from a user device claiming to be associated with the telephone number, the nonce may authenticate or verify this claim. In other words, the nonce may provide security against devices spoofing telephone numbers. In one embodiment, each nonce is unique to the corresponding telephone number or long and/or random so that the nonce is sufficiently difficult to guess.

Exemplary Processes

Figure 6A:
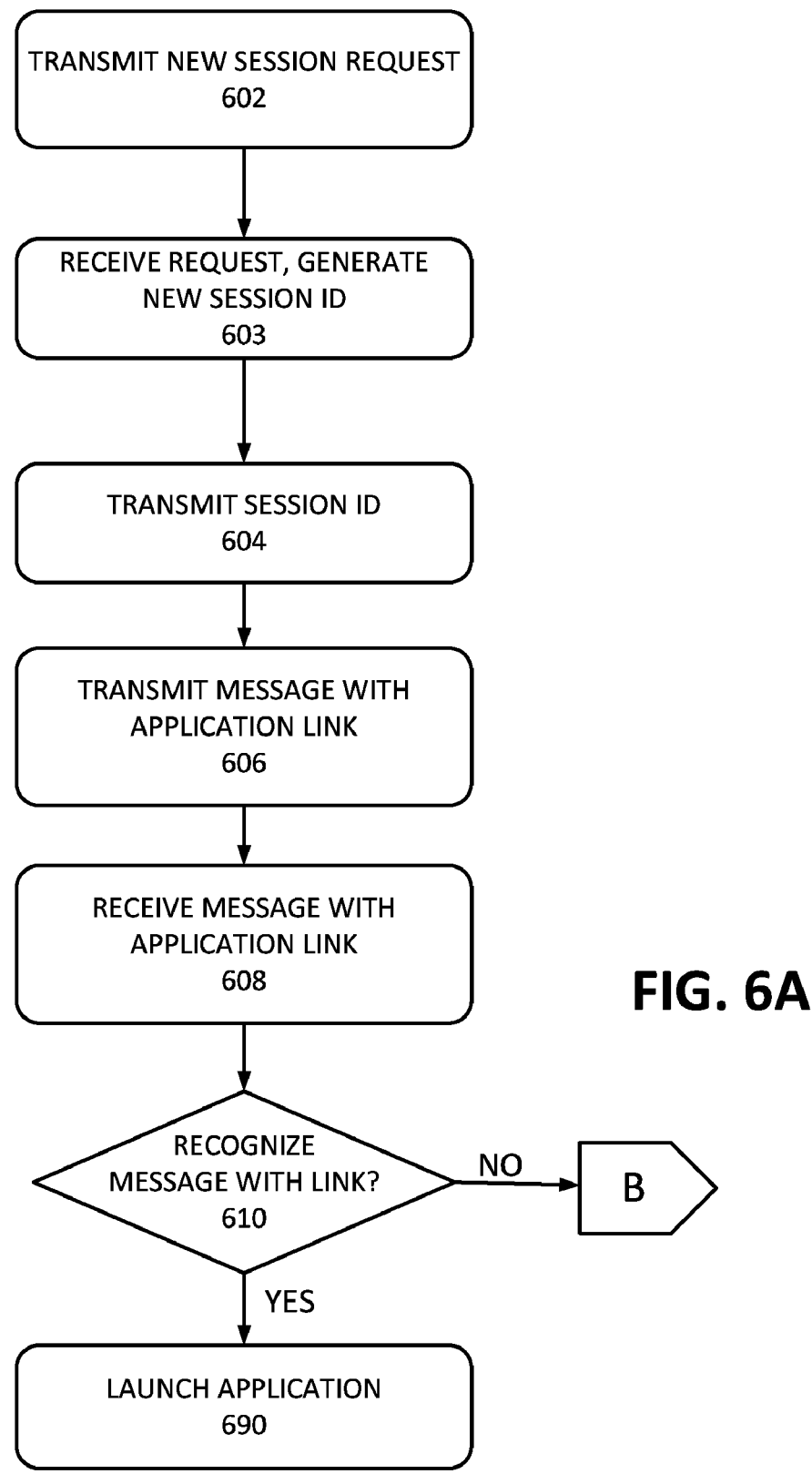
FIGS. 6A through 6D are flowcharts of an exemplary process for sharing and application from one user device to another and connecting the applications in a session.
Figure 6B:
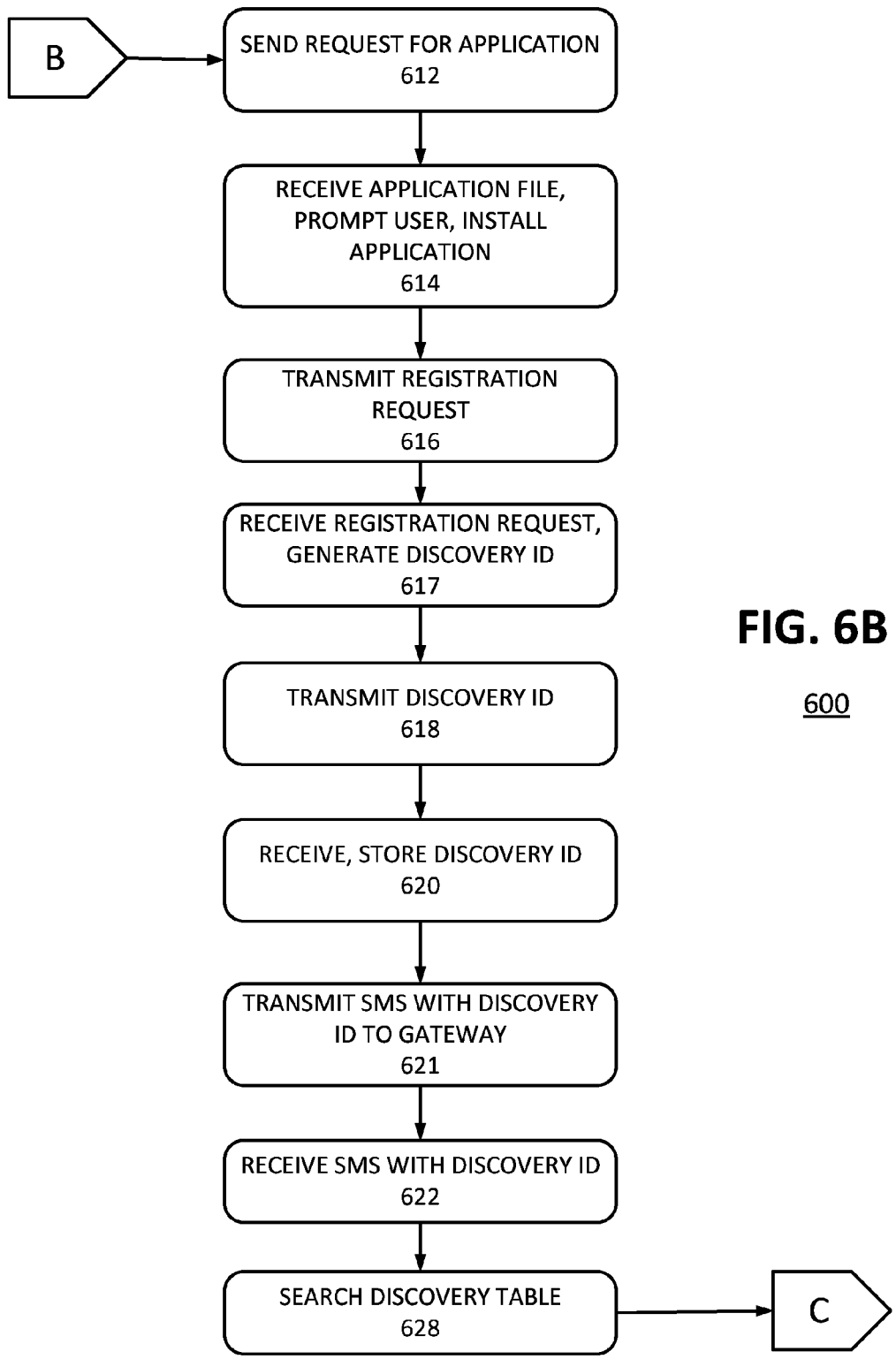
Figure 6C:
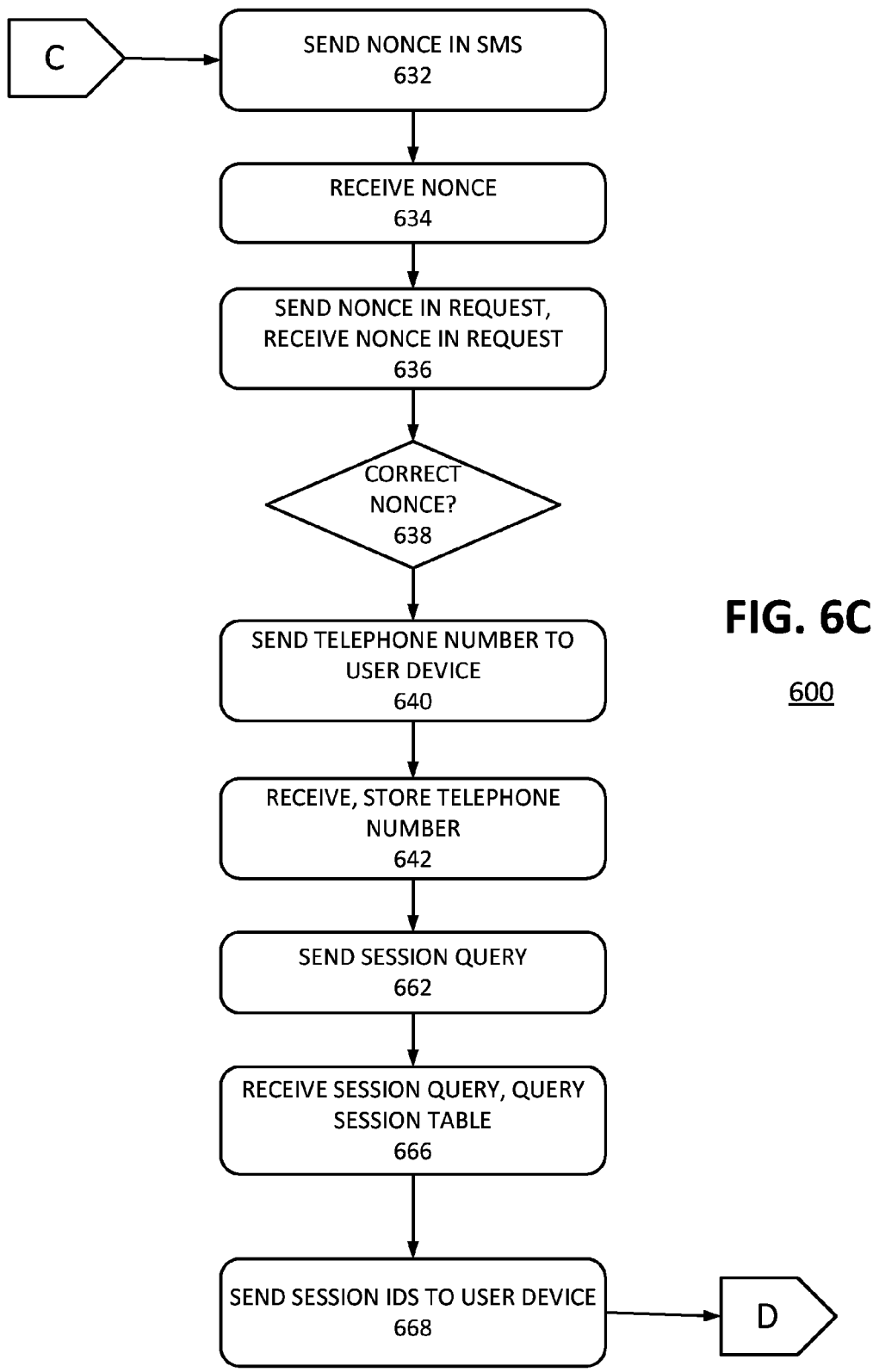
Figure 6D:
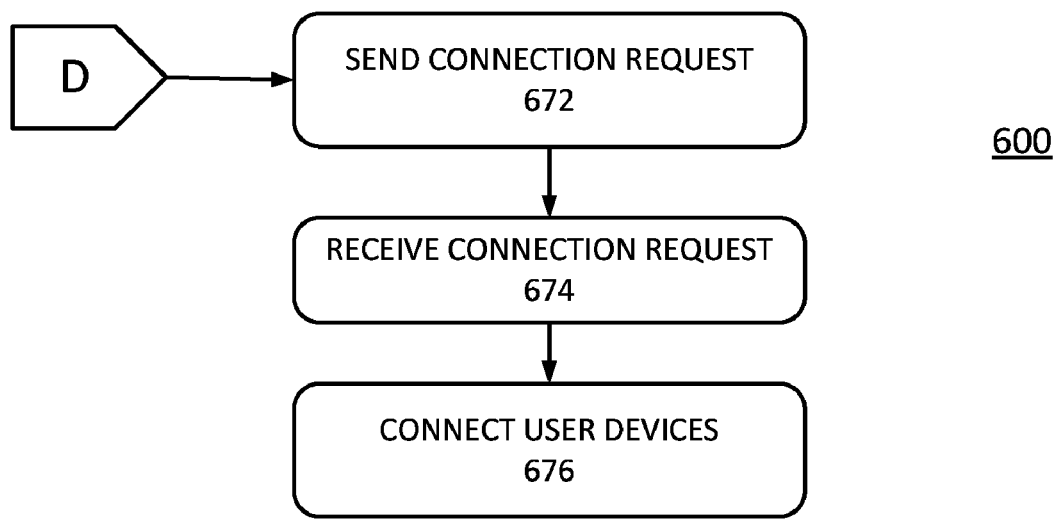
Figure 7A:
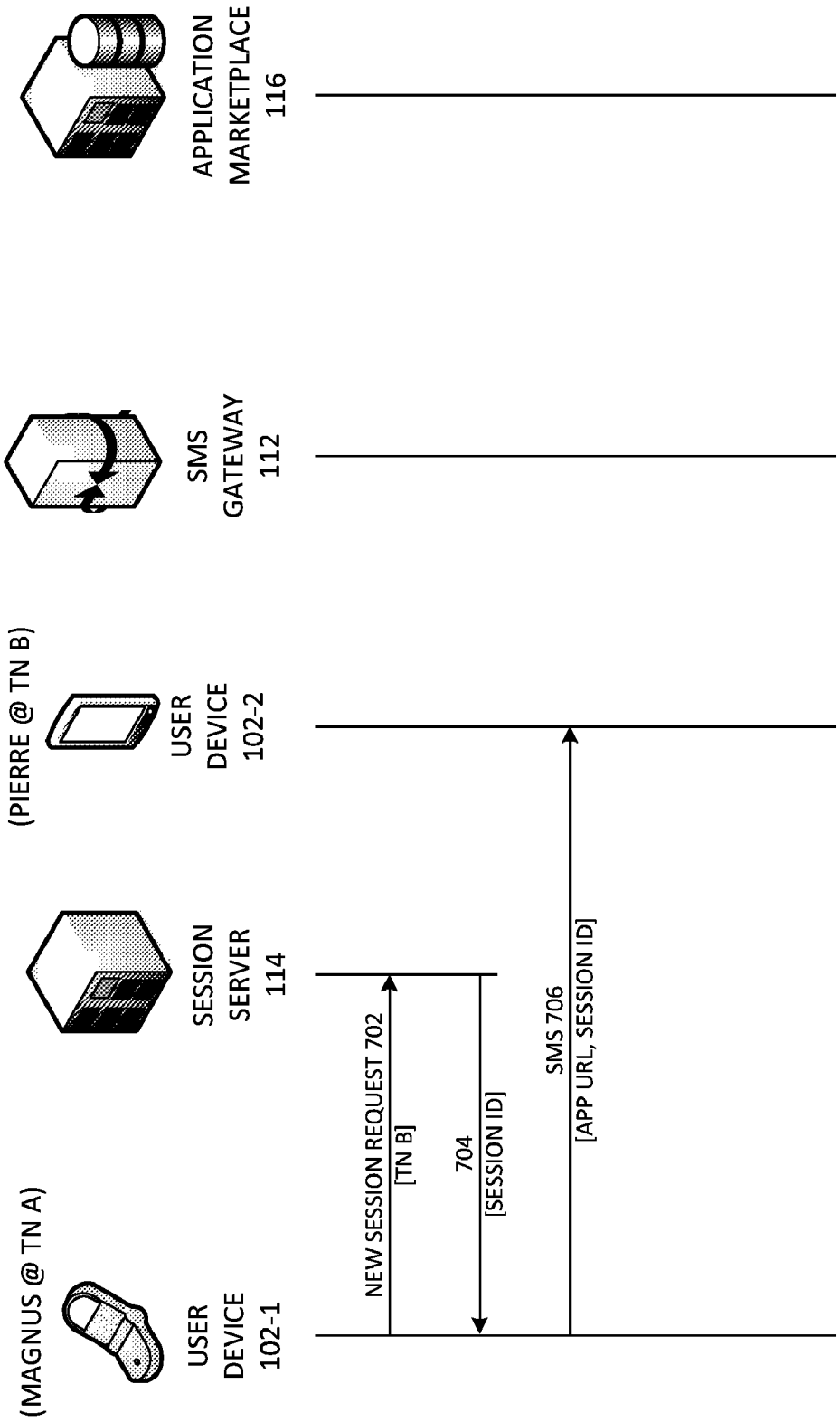
FIGS. 7A through 7C are signal diagrams of messages sent between devices in the environment of FIG. 1.
Figure 7B:
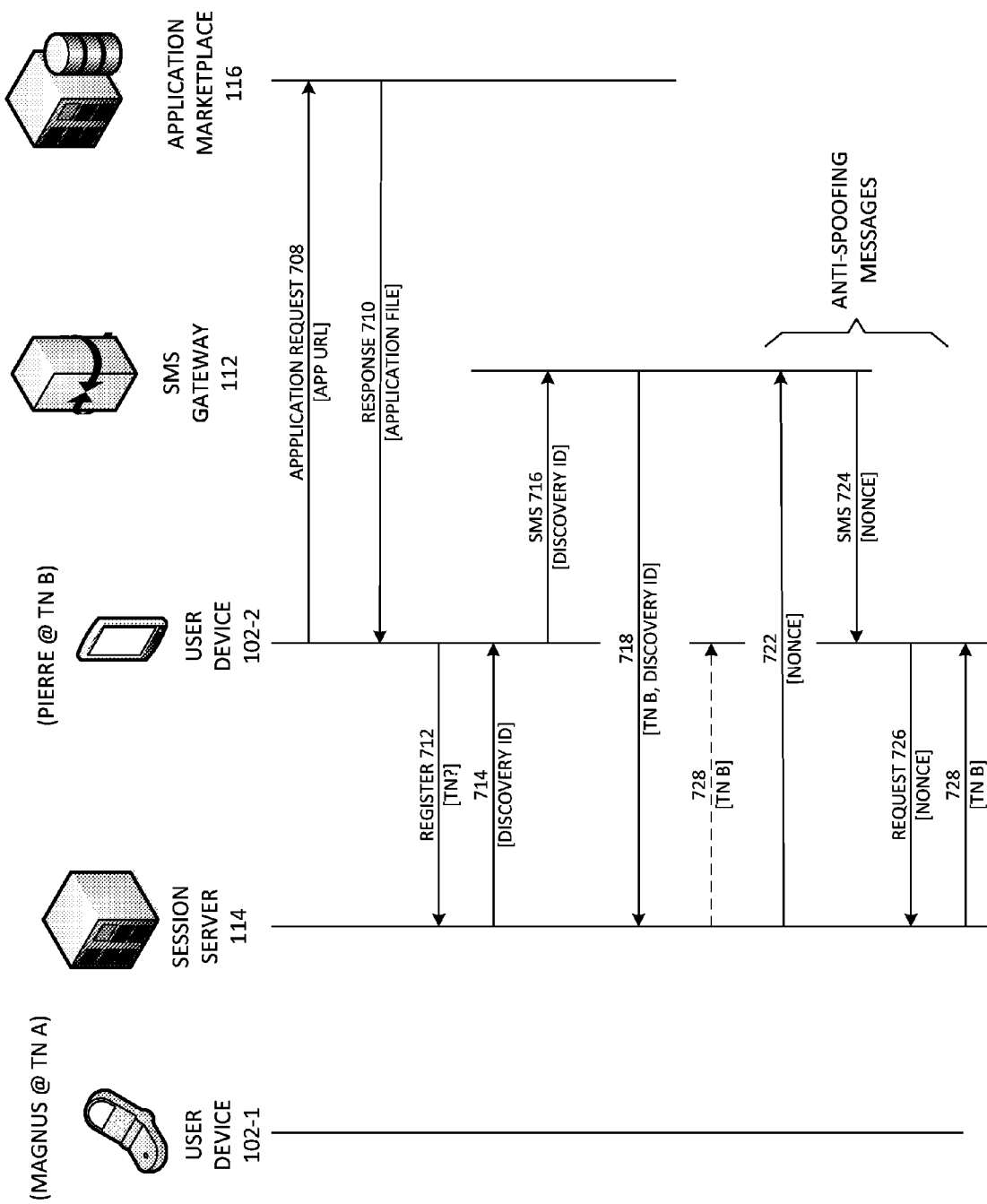
Figure 7C:
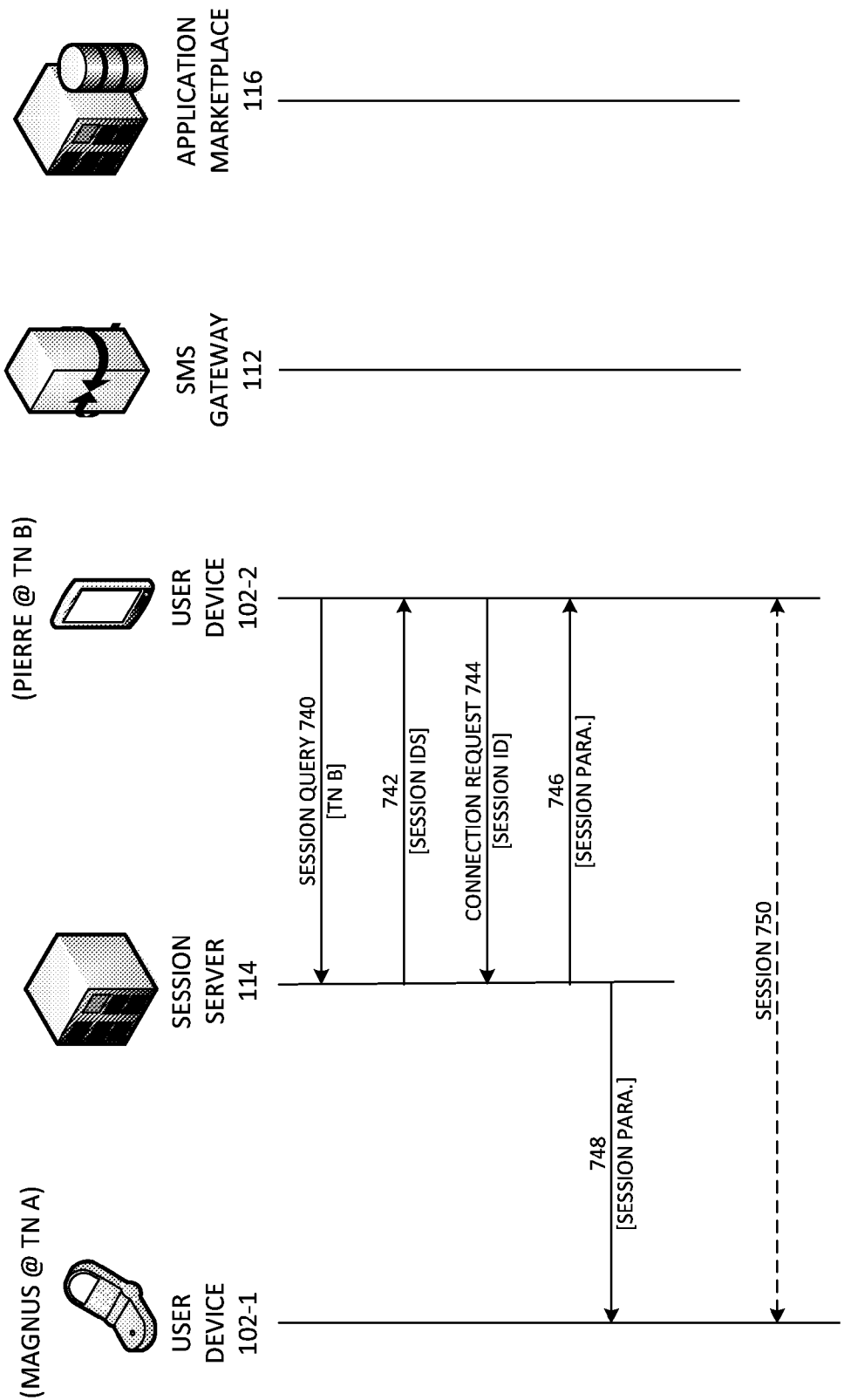

FIGS. 6A through 6C are flowcharts of an exemplary process 600 for establishing a session between two devices, such as session 108 between user device 102-1 and user device 102-2 (see FIG. 1B). FIGS. 7A through 7C are signal diagrams of messages sent between devices in environment 100 for establishing session 108. Messages in FIGS. 7A through 7C may pass through network 106 through an IP network (e.g., the Internet). Some messages, such as SMS messages, may use a communication path other than through an IP network.

In the example used below, Magnus is the user of device 102-1 and Pierre is the user of device 102-2. Further, the telephone number associated with device 102-1 is TN A and the telephone number associated with device 102-2 is TN B. Magnus has already downloaded application 402-1 (e.g., a tank battle game called BattleZ) from application marketplace 116 to user device 102-1. Magnus likes application 402-1 so much that he wants to invite his friend, Pierre, to join him in an interactive session (e.g., an interactive tank battle over session 108). Application 402-1 may include an "invite friend to play" feature. Using this feature, Magnus may manually enter Pierre's telephone number (TN B) into application 402-1 for sending an invitation to Pierre to play the interactive game. In another embodiment, application 402-1 may allow Magnus to retrieve Pierre's telephone number (TN B) from Magnus' contact list. As discussed below, however, Pierre has not yet downloaded application 402-2 (e.g., BattleZ) to user device 102-2.

Process 600 may begin with application 402-1 in user device 102-1 transmitting a new session request 702 to session server 114 (block 602). Session request 702 may include the telephone number of the user device invited to the new session (e.g., TN B for user device 102-2 belonging to Pierre). In one embodiment, session request 702 may also include the telephone number of the inviting user device (e.g., TN A for user device 102-1 belonging to Magnus). In another embodiment, session request 702 may not include the telephone number of the inviting user device.

Session server 114 may receive request 702 for a new session and assign a new session ID for the new session (block 603). The session ID may uniquely identify the session created by session server 114 for application 402-1 running in user device 102-1. Session server 114 may store the session ID in session table 424. In the current example, session server 114 may create a record 516 in session table 424 (see FIG. 5A) corresponding to the new session requested by user device 402-1. The session is assigned a session ID of 65387. Session server 114 may transmit a message 704 including the session ID to application 402-1 in user device 102-1 (block 604). User device 102-1 receives message 704 and may store the session ID.

User device 102-1, as instructed by application 402-1, may transmit an SMS message 706 to user device 102-2 requesting that user device 102-2 join the new session (block 606). SMS message 706 may include a personal message from the inviting user to the invited user. For example, FIG. 2 shows exemplary SMS message 706 from Magnus to Pierre with the following personal message: "Pierre, you have to check out this new game. I challenge you to a battle." Application 402-1 may also include the network address (e.g., a URI or a URL) in SMS message 706 to identify the application for the invited party to download, if the invited party has not already downloaded the application. For example, exemplary SMS message 706 includes a URL 262: www.battleZ.com/redirect. SMS message 706 also includes instructions for the invited party to download the application, as shown in FIG. 2.

In one embodiment, SMS message 706 may also include the session ID received by application 402-1 in user device 102-1 in message 704. For example, the session ID may be included in the URL in SMS message 706, which may appear as follows: www.battleZ.com/redirect?SID=65387, where 65387 is the session ID. In another embodiment, the session ID may not form part of the URL, but may be follow the instructional text, for example, as shown in FIG. 2. In one embodiment, SMS message 706 may be an email instead of an SMS message.

User device 102-2 may receive SMS message 706 (block 608) and, if SMS message 706 is not recognized (block 610: NO), then process 600 may proceed to block 612 in FIG. 6B. Message 706 may be recognized, for example, if the application identified by the URL in message 706 has previously been downloaded and installed. In this case, the installed application may be monitoring received SMS messages. In the current example, however, Pierre has not downloaded application 402-2 to device 102-2. Thus, because user device 102-2 does not yet have application 402-2 (e.g., BattleZ) installed, Pierre may select URL 262 in SMS message 706 to install the application. In response, user device 102-2 may send an application request 708 (FIG. 7B) to application marketplace 116 for application 402-2 (e.g., BattleZ) (block 612). In one embodiment, URL 262 in SMS message 706 may actually redirect user device 102-2 to application marketplace 116, to save characters in SMS message 706.

In response to application request 708, application marketplace 116 may send a response 710 (including the requested application file 402-2) to user device 102-2. User device 102-2 may receive response 710 and may prompt Pierre to install the application file and execute the application (block 614). Thus, in this example, Pierre downloads and installs BattleZ as encouraged by his friend Magnus. One embodiment allows for the same application request (e.g., URL) and/or the same response 710 (e.g., application file) for each inviting SMS message (e.g., SMS message 706) even though a different session (e.g., session 750) may result connecting different user devices (e.g., user devices 102-1 and 102-2). This embodiment allows for an application file to be signed by application marketplace 116 and verified by the user device. Another embodiment may allow for a different application file to be transmitted to different user device (e.g., dependent on the session ID or SMS message 716).

Upon execution, application 402-2 may transmit a registration request 712 to session server 114 (block 616). In one embodiment, application 402-2 may automatically send registration request 712 when first executed in user device 102-2. In another embodiment, application 402-2 may send registration request 712 when determined that it is unaware of the telephone number (e.g., TN B) of its host device (e.g., device 102-2). In this embodiment, registration request 712 may include an indication that the application in user device 102-2 is not yet aware of the telephone number (e.g., TN B).

Session server 114 may receive registration request 712 and generate a discovery ID (block 617). In one embodiment, the generated discovery ID may uniquely identify and be associated with registration request 712. For example, session server 114 may generate a discovery ID of 58934 and create a record 522 in discovery table 428. Session server 114 may associate this discovery ID with the connection to user device 102-2 using connection field 544. In this example, at this point in time, however, session server 114 may not yet be aware of the telephone number associated with user device 102-2 and may leave TN field 546 blank.

Session server 114 may send a message 714 including the discovery ID to application 402-2 in user device 102-2 (block 618). Application 402-2 in user device 102-2 may receive message 714 and may store the included discovery ID (block 620). User device 102-2, instructed by application 402-2, may send an SMS message 716 to SMS gateway 212 including the discovery ID (block 621). In this embodiment, application 402-2 may store the telephone number that identifies SMS gateway 212 allowing it to send an SMS message to SMS gateway 212.

When SMS gateway 212 receives SMS message 716 (block 622), it may determine the telephone number (TN B) associated with user device 102-2 by virtue of a caller ID service provided by network 106 (e.g., a mobile network). SMS gateway 212 may send a message 718 to the session server 114 including the telephone number (TN B) associated with user device 102-2 and the discovery ID. Session server 114 may receive message 718 and may search for a match in discovery table (block 628). If a match to the discovery ID in message 718 is found, session server 114 may store the telephone number of user device 102-2 (TN B) in discovery table 428. In the example with Pierre, message 714, SMS message 716, and message 718 include the discovery ID of 58934, which matches record 516 in discovery table 428. Thus, session server 114 may store the telephone number (TN B) provided in message 718 and associated with user device 102-2 in discovery table 428 in TN field 546.

In one embodiment, session server 114 may transmit a message 728 to application 402-2 in user device 102-2 (e.g., using the corresponding connection in connection field 544 of discovery table 428). Message 728 may include the telephone number (TN B) received in message 718. Thus, in this embodiment, application 402-2 may become aware of the telephone number associated with its host device (e.g., user device 102-2).

In another embodiment, however, session server 114 may seek to ensure that a user device has not spoofed its telephone number (e.g., when sending SMS message 716 to SMS gateway 112) before session server 114 sends message 728 to user device 102-2. In this embodiment, session server 114 may send a message 722 including a nonce to SMS gateway 112. Message 722 may also include the telephone number (e.g., TN B) to be verified as authentic. Session server 114 may store the nonce and the associated telephone number in anti-spoofing table 426. For example, in the case of Pierre, session server 114 generated a nonce of 63891 and stored this nonce in record 554 along with the telephone number (TN B) associated with the user device 102-2.

SMS gateway 212 may send an SMS 724 including the nonce to user device 102-2 (block 632), as shown in FIG. 6C. Mobile phone 102-2 may receive SMS 724 and store the included nonce (block 634). In one embodiment, user device 102-2 may send the nonce to session server 114 in a request 726 (block 636) for the telephone number. Session server 114 may receive message 726 including the nonce (block 636). If the nonce is correct (block 638: YES), then session server 114 may transmit message 728 including the telephone number (TN B) to application 402-2 in user device 102-2 (block 640). In the case of Pierre, SMS message 724 includes a nonce of 63891, which is forwarded to session server 114 in request 726. Session server 114 searches anti-spoofing table 426 and determines that user device 102-2 associated with the telephone number (TN B) is not spoofing its telephone number because the correct nonce was received from application 402-2 running in device 102-2. User device 102-2 may receive and store the telephone number in the application (block 642).

Application 402-2 in user device 102-2 may transmit a session query 740 (FIG. 7C) to session server 114 (block 662). Session query 740 may include the telephone number (TN B) of user device 102-2 learned, for example, from message 728 (FIG. 7B). In one embodiment, session query 740 may include the nonce learned by application 402-2 from SMS message 724 (FIG. 7B) as well for continued verification.

Session server 114 may receive session query message 740 (block 666). In one embodiment, query message 740 includes the nonce to authenticate query message 740. Session server 114 may search session table 424 for any open sessions for the telephone number in query message 740 (block 666). If there is an open session for the telephone number, then session server 114 may transmit a message 742 to application 402-2 in user device 102-2. Message 742 may include any session IDs found in session table 424 that correspond to the telephone number (block 668). In the case of Pierre, session query 740 includes his telephone number (TN B). Session server 114 finds record 516 (with TN B in party field 504) and sends the session ID of 65387 to application 402-2 in Pierre's device 102-2. In one embodiment, message 742 may include other information about open sessions, such as the inviting contact name (e.g., Magnus) or telephone number (e.g., TN A).

User device 102-2 may receive message 742 including the session information and may prompt Pierre for permission to establish a session. If the user agrees, application 402-2 in user device 102-2 may send a connection request 744 to session server 114 (block 672). Connection request 744 may include the session ID to which application 402-2 wishes to connect. In one embodiment, connection request 744 may include the telephone number of user device 102-2 (e.g., TN B) and the associated nonce.

Session server 114 may receive the connection request (block 674) and session server 114 may connect user device 102-1 and user device 102-2 in session 750 (block 676). In one embodiment, connection request 744 may include the telephone number/nonce pair and session server 114 may check anti-spoofing table 426 to determine if the telephone number/nonce pair is correct.

In one embodiment, connecting user device 102-1 and user device 102-2 may include transmitting a messages 746 and 748 including session parameters to applications 402-1 and 402-2 in user devices 102. Session parameters may include, for example, the external-facing IP address and port numbers of each device and real-time protocol (RTP) parameters. User device 102-1 and user device 102-2 may receive the session parameters and may establish session 750. In this embodiment, session 750 between applications 402 in user devices 102 may be direct (e.g., without a proxy such as session server 114). In one embodiment, applications 402 may use a STUN (Session Traversal Utilities for NAT (Network Address Traversal)) server, for example, to initially navigate through firewalls and/or NAT routers.

In one embodiment, connecting applications 402 in user devices 102 in session 750 may include a proxy, such as session server 114. In this embodiment, session server 114 may use the connections already established with session server 114 to each user device 102-x.

After playing a game, Magnus and Pierre may invite Pierre to play again at a later time, for example. In this case, installed application 402-2 may have also installed a daemon that actively watches for SMS messages including URL 262. The SMS message may be recognized (block 610: YES) and application 402-2 may be launched. Application 402-2 may also retrieve the session ID from the SMS and use this session ID in another connection request, similar to connection request 744.

In one embodiment, application request 708 may include the session ID received in SMS message 706, if SMS message 706 included a session ID. In this embodiment, a redirecting server may extract the session ID for record keeping. In this example, session server 114 may determine how many download requests turn into established sessions. Such information may be useful, for example for bug detection among other things. Further, in this example, the redirection URL (e.g., to application marketplace 116) may be the same redirection URL for each download. In other embodiments, any of messages in FIGS. 7A through 7C may be sent as SMS messages.

In one embodiment, message 728 may return to user device 102-2 an identifier (e.g., a "registration ID") other than the telephone number associated with device 102-2. In this embodiment, the registration ID may identify device 102-2 and/or application 402-2 with the registration ID. Session server 114 may store a table of telephone numbers and corresponding registration IDs. In this embodiment, request 726 may include the registration ID and session server 114 may query the registration ID table to receive the corresponding telephone number. Likewise, new session request message 702, may include the registration ID of the inviting device (e.g., mobile device 102-1), to the extent the request identifies the requesting user device at all. Likewise, in one embodiment, SMS message 706 may include the registration ID of the inviting device, and/or the telephone number of the inviting device (if known), if the body of message 706 identifies the inviting device at all (e.g., other than by the session ID). This embodiment may allow for greater security and privacy if there is a concern with an application learning the telephone number associated with the user device. In one embodiment, the nonce in message 722 may also act as the registration ID.

In one embodiment, the session ID may be generated by the inviting user device (e.g., user device 102-1). In this embodiment, the session ID may include a Universally Unique Identifier (UUID), for example, that has a very low probability of collision with any other session ID being generated by any other device. The session ID may be transmitted to session server 114 by the inviting user device (e.g., in new session request signal 702). Likewise, the discovery ID may be generated by the invited user device (e.g., user device 1-2-2). In this embodiment, the discovery ID may include a UUID that has a very low probability of collision with any other discovery ID being generated by any other device. The discovery ID may be transmitted to session server 114 by the user device (e.g., in register signal 712).

In one embodiment, the nonce in message 722 may also act as the discovery ID in message 714, where message 714, for example, may be transmitted as an SMS message. In this embodiment, register request message 712 may be sent as an SMS message to session server 114 through SMS gateway 112 so that the discovery ID/nonce may be sent back to the user device (e.g., user device 102-2) as an SMS message.

In one embodiment, the nonce and telephone number pair (or registration ID pair) may be used for authentication for each communication with session server 114 from a user device.

In one embodiment, the discovery and connection of user devices for the viral spread of applications may be offered as a service to applications. In this embodiment, session server 114 and/or SMS gateway 112 may open its API (application program interface) to user devices and/or other servers. Session server 114 and SMS gateway 112 may be owned by one entity (e.g., the device manufacturer, network owner, or mobile telephone carrier) and the telephone numbers associated with devices may be stored in session server 114 and SMS gateway 112 for privacy and security considerations (e.g., when combined with the registration ID embodiment discussed above). Further, this embodiment may also allow for small application developers to spread their applications and connect users without having access to a session server or SMS gateway. In this embodiment, another server (e.g., an "app server," not shown) may exist and be associated with a particular user device application. In this embodiment, user device 102-1 may send a second new session signal to the app server. User device 102-2 may send connection request 744 to the app server. The app server may then connect user devices 102.

CONCLUSION

The foregoing description of the embodiments described herein provides illustration and description, but is not intended to be exhaustive or to limit the invention to the precise form disclosed. Modifications and variations are possible in light of the above teachings or may be acquired from the practice of the invention.

Further, while series of acts have been described with respect to FIG. 6, the order of the acts may be varied in other implementations consistent with the invention. Moreover, non-dependent acts may be performed in parallel.

It will also be apparent to one of ordinary skill in the art that aspects of the invention, as described above, may be implemented in computer devices, cellular communication devices/systems, media playing devices, methods, and/or computer program products. Accordingly, aspects of the present invention may be embodied in hardware and/or in software (including firmware, resident software, micro-code, etc.). Furthermore, aspects of the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Although one or more embodiments herein may allow for a session between two user devices without one user actively registering the application, picking a username, select a password, etc., one or more embodiments may ask the user to actively register, pick a username, and/or select a password, etc.

Further, certain portions of the invention may be implemented as "logic" that performs one or more functions. This logic may include hardware, such as a processor, a microprocessor, an ASIC, an FPGA or other processing logic, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Further, the phrase "based on," as used herein is intended to mean "based, at least in part, on" unless explicitly stated otherwise. The scope of the invention is defined by the claims and their equivalents.

What is claimed is:

1. A method, comprising:
    generating a discovery ID, wherein the discovery ID identifies an IP connection between a network device and a user device;
    receiving a short message service (SMS) message from the user device, wherein the SMS message includes the discovery ID;
    determining a telephone number associated with the user device based on a sender ID of the SMS message;
    determining the IP connection between the network device and the user device associated with the telephone number based on the discovery ID received in the SMS message; and
    transmitting a value indicative of the telephone number to the user device through the IP connection based on the determined IP connection.

2. The method of claim 1, comprising:
    generating a nonce and transmitting an SMS message including the nonce to the user device using the determined telephone number;
    wherein transmitting the value indicative of the telephone number to the user device includes transmitting the value indicative of the telephone number to the user device in response to receiving the nonce from the user device through the IP connection; and
    wherein transmitting the value indicative of the telephone number to the user device includes transmitting the telephone number to the user device through the IP connection identified by the discovery ID.

3. The method of claim 1, the method further comprising:
    receiving a session request from another user device, the session request for connecting to the user device associated with the telephone number; and
    connecting the user device and the other user device in a session or transmitting information to the other user device and the user device for connecting in a session.

4. The method of claim 3, further comprising:
    receiving a request from the user device for an identification of the session, wherein the request for the identification of the session includes the value indicative of the telephone number.

5. The method of claim 4, further comprising:
    transmitting the identification of the session to the other device for the other user device to send to the user device.

6. The method of claim 1, wherein generating the discovery ID includes generating the discovery ID at the network device, the method further comprising:
    transmitting the discovery ID to the user device through the IP connection.

7. A system, comprising:
    a network device comprising
        a memory to store a table of discovery IDs, wherein each discovery ID identifies one of a plurality of IP connections between the network device and a corresponding user device of a plurality of user devices;
    a short message service (SMS) gateway comprising a receiver to receive an SMS message from one of the plurality of user devices, the SMS message including one of the plurality of discovery IDs;
    wherein the network device further comprises
        a processor to determining the telephone number associated with the one of the plurality of user devices based on a sender ID of the SMS message and to determine the corresponding IP connection based on the discovery ID received in the SMS message and the table of discovery IDs; and
        a transmitter to send a value indicative of the telephone number to the one of the plurality of user devices.

8. The system of claim 7,
    wherein the processor generates a nonce;
    wherein the SMS gateway includes a transmitter to transmit an SMS message including the nonce to the one of the plurality of user devices using the determined telephone number; and
    wherein the transmitter of the network device is configured to send the value indicative of the telephone number to the user device in response to receiving the nonce from the user device through the IP connection.

9. The system of claim 7,
    wherein a receiver in the network device is configured to receive a session request from another user device, the session request for connecting to the user device associated with the telephone number; and
    wherein the network device connects the user device and the other user device in a session or wherein the transmitter is configured to transmit information to the other user device and the user device for connecting in a session.

10. The system of claim 9,
    wherein the receiver of the network device is configured to receive a request from the user device for an identification of the session, wherein the request for the identification of the session includes the value indicative of the telephone number.

11. The system of claim 10, wherein the transmitter is configured to transmit the value indicative of the session to the other device for the other user device to send to the user device.

12. The system of claim 7,
    wherein the transmitter transmits the discovery ID to the user device through the IP connection, and wherein the transmitter transmits the telephone number to the user device through the IP connection.

13. The system of claim 7, further comprising the user device and the other user device, wherein the user device includes a transmitter to send the SMS message from the user device including the discovery ID.

14. A method, comprising:
transmitting a short message service (SMS) message from a user device,
   wherein the SMS message includes a discovery ID that identifies an IP connection between a network device and the user device,
   wherein the SMS message is used to determine the telephone number associated with the user device based on a sender ID of the SMS message;
   wherein the IP connection is identified based on the discovery ID in the SMS message; and
receiving a value indicative of the telephone number in the user device through the IP connection identified by the discovery ID.

15. The method of claim 14, comprising:
receiving a nonce in an SMS message and transmitting a message including the nonce to a network device; and
wherein receiving the value indicative of the telephone number includes receiving the value indicative of the telephone number after transmitting the message including the nonce.

16. The method of claim 14, further comprising:
transmitting a request from the user device for an identification of a session, wherein the request for the identification of the session includes the value indicative of the telephone number.

17. The method of claim 16, further comprising:
receiving the identification of the session.

18. The method of claim 15, further comprising:
receiving the discovery ID from the network device.

19. The method of claim 14, the method further comprising:
transmitting a session request from another user device, the session request for connecting to the user device associated with the telephone number; and
connecting the user device and the other user device in a session or transmitting information to the other user device and the user device for connecting in a session.

20. The system of claim 7, wherein the transmitter is configured to send the value indicative of the telephone number to the one of the plurality of user devices through the corresponding IP connection.

* * * * *